(12) United States Patent
Segerstrom

(10) Patent No.: US 10,994,497 B2
(45) Date of Patent: May 4, 2021

(54) SYSTEM AND METHOD FOR INCREASING DENSITY OF STRUCTURAL COMPOSITES

(71) Applicant: Lane Segerstrom, Stratford, TX (US)

(72) Inventor: Lane Segerstrom, Stratford, TX (US)

( * ) Notice: Subject to any disclaimer, the term of this patent is extended or adjusted under 35 U.S.C. 154(b) by 65 days.

(21) Appl. No.: 15/669,820

(22) Filed: Aug. 4, 2017

(65) Prior Publication Data

US 2018/0036965 A1 Feb. 8, 2018

Related U.S. Application Data

(60) Provisional application No. 62/371,547, filed on Aug. 5, 2016.

(51) Int. Cl.

| | |
|---|---|
| *B29C 70/14* | (2006.01) |
| *B27N 3/00* | (2006.01) |
| *B27N 3/04* | (2006.01) |
| *B27N 1/00* | (2006.01) |
| *B27N 1/02* | (2006.01) |
| *B27N 3/14* | (2006.01) |
| *B29K 311/10* | (2006.01) |

(52) U.S. Cl.
CPC ............... *B29C 70/14* (2013.01); *B27N 3/00* (2013.01); *B27N 3/04* (2013.01); *B27N 1/003* (2013.01); *B27N 1/029* (2013.01); *B27N 3/143* (2013.01); *B29K 2311/10* (2013.01)

(58) Field of Classification Search
CPC ......... B29C 70/14; B29C 70/34; B29C 70/42; B27N 3/04
See application file for complete search history.

(56) References Cited

U.S. PATENT DOCUMENTS

| | | | |
|---|---|---|---|
| 2,958,199 A | 11/1960 | Anderson et al. | |
| 3,180,741 A | 4/1965 | Wainer et al. | |
| 3,932,350 A | * 1/1976 | Yamaguchi | ............... C08J 5/043 |
| | | | 524/650 |

(Continued)

OTHER PUBLICATIONS

Hernandez, S., et al., Optimization of curing cycle in carbon fiber-reinforced laminates: Void distribution and mechanical properties, Composites Science and Technology, vol. 85 (2013), pp. 73-82. (Year: 2013).*

(Continued)

*Primary Examiner* — Matthew J Daniels
(74) *Attorney, Agent, or Firm* — Foley & Lardner LLP

(57) ABSTRACT

In one embodiment, a method for making a high density structural composite includes depositing a plurality of fibrous materials on or adjacent a first plate or surface. A polymer liquid is deposited onto the plurality of fibrous materials to form a composite mixture. A first cyclic pressure is applied onto the composite mixture to compress the composite mixture. In some embodiments, the cyclic pressure may then be reduced to a valley pressure to complete a pressurization cycle. In some instances, the valley pressure may be below atmospheric pressure to induce trapped air and volatile gases to escape from the composite mixture before curing. The pressurization cycle may be repeated. A second pressure, which may be a constant pressure in some embodiments, may be applied to the composite mixture using, in some embodiments, a second plate until the polymer liquid has at least partially cured or partially solidified.

20 Claims, 4 Drawing Sheets

(56) References Cited

U.S. PATENT DOCUMENTS

| | | | | |
|---|---|---|---|---|
| 5,093,051 | A | * | 3/1992 | Reiniger .................. B27N 3/20 |
| | | | | 264/109 |
| 5,158,012 | A | | 10/1992 | Gawlitta et al. |
| 5,217,665 | A | | 6/1993 | Lim et al. |
| 5,411,691 | A | | 5/1995 | Hwang |
| 5,834,105 | A | * | 11/1998 | White ....................... B32B 9/02 |
| | | | | 428/297.4 |
| 5,985,197 | A | * | 11/1999 | Nelson ................... A63B 53/04 |
| | | | | 264/221 |
| 6,149,844 | A | * | 11/2000 | Graham .................. B29C 33/04 |
| | | | | 264/257 |
| 6,331,028 | B1 | | 12/2001 | O'Neill et al. |

OTHER PUBLICATIONS

PCT Patent Application No. PCT/US2017/045634, International Preliminary Report on Patentability, dated Feb. 14, 2019, 9 pgs.

\* cited by examiner

SYSTEM AND METHOD FOR INCREASING DENSITY OF STRUCTURAL COMPOSITES

CROSS-REFERENCE TO RELATED APPLICATIONS

This application claims the benefit of the filing date of U.S. Provisional Patent Application No. 62/371,547, filed on Aug. 5, 2016. The contents of U.S. Application No. 62/371,547 are incorporated by reference in their entirety as part of this this application for all purposes.

FIELD

This disclosure relates to a manufacturing process for structural polymeric composites.

BACKGROUND

Structural composites often include laminated polymeric composites and polymeric matrices. In some instances, the polymeric composites contain particulate byproducts of corn or fibrous components of corn (e.g., corn stover including stalks and leaves), because such fibrous components cost little as byproducts of corn production. Corn-based structural composites have been previously disclosed in U.S. Pat. No. 5,834,105 and the disclosure is fully incorporated herein by reference for any and all purposes. Besides corn-based structural composites, other materials may also be used, such as bamboo, gypsum, wood, kenaf, hemp, sugarcane, or paper.

The polymeric composites are bonded in polymeric matrices formed from a polymer binder such as epoxy, acrylic, or other types or resin or curable materials solidified under thermal or polymerization processes. For example, a curable polymer liquid may cure in a predetermined period of time. In its liquid form, the polymer liquid is mixed with the fibrous materials. The composite mixture is then compressed until the polymer liquid cures into a solid. Many defects may result during the curing process, for example, air may be trapped in the mixture and result in a porous or weak structure, or structure with unpredictable mechanical or other characteristics.

SUMMARY

This disclosure describes a manufacturing system and method for increasing density of structural composites. At a high level, the manufacturing system and method can remove trapped air and gases, including volatile gases, in the composite materials before the polymeric matrix fully cures. The system and method applies a number of varying pressure cycles that enable trapped air and volatile gases to escape from the composite materials.

A method for making a structural composite board, the method comprising: depositing fibrous materials on a first surface and depositing a polymer liquid onto the fibrous materials to form a composite mixture. A first cyclic pressure is applied onto the composite mixture, for example, by using a second surface to compress toward the first surface. The cyclic pressure is for releasing trapped air and volatile gases from the composite mixture and is ended to complete a pressurization cycle. One or more pressures is then applied for a period of time to the composite mixture until the polymer liquid has become cured. In some instances, the first and the second surfaces are flat. In some instances, the cyclic pressure may be applied by changing an ambient pressure of the composite mixture, such as by use of a pressure chamber.

The method further includes mixing the fibrous materials and the polymer liquid using a mechanical means to evenly distribute the liquid onto the fibrous materials to form the composite mixture.

In some embodiments, the fibrous materials absorbs and becomes saturated with the polymer liquid.

In some other embodiments, the polymer liquid weighs about 8% of a net weight of the fibrous materials. In other embodiments, the polymer liquid weighs about between 3% and 20% of a net weight of the fibrous materials.

In yet some other embodiments, the fibrous materials is deposited in multiple layers, each layer having a primary orientation of the fibrous materials.

In some embodiments, the primary orientations of the multiple layers inclusively vary between about 45-45 degrees to about 0-90 degrees.

In some other embodiments, the fibrous materials are deposited in a random manner.

In yet some other embodiments, the fibrous materials comprise corn husks or leaves or both.

In some embodiments, the polymer liquid starts to cure in about twenty to thirty minutes.

In some other embodiments, the first cyclic pressure is characterized by an increase rate, a peak pressure value, a duration to maintain the peak pressure value, and a decrease rate.

In yet some other embodiments, the second constant pressure is characterized by a constant pressure value.

In some embodiments, the peak pressure value approximately equals to the constant pressure value.

A system for making a high density composite board, the system includes a compression station. The compression station includes a first surface holding a plurality of fibrous materials; a dispenser operable to deposit a polymer liquid onto the fibrous materials to form a composite mixture; and a second surface operable to compress the composite mixture against the first surface; and a control terminal outputting a pressure signal for controlling the second surface. The pressure signal includes cycles including an application of a first cyclic pressure and a reduction of the first cyclic pressure before the polymer liquid solidifies; and a second constant pressure for a period of time sufficient for the polymer liquid to cure into a solid compound. In some instances, the first and the second surfaces are flat. In some instances, the first and the second surfaces are contoured, such as forming a mold of a designed shape, including a rectangular board, a round board, or other more complicated shapes.

In some embodiments, the polymer liquid weighs about 8% of a net weight of the fibrous materials.

In some other embodiments, the fibrous materials is deposited in multiple layers, each layer having a primary orientation of the fibrous materials.

In yet some other embodiments, the primary orientations of the multiple layers inclusively vary between about 45-45 degrees to about 0-90 degrees.

In some embodiments, the fibrous materials are deposited in a random manner.

In some other embodiments, the fibrous materials comprise a biomass material including corn husks or leaves or both.

In yet some other embodiments, the polymer liquid starts to cure in about twenty to thirty minutes.

In some embodiments, the first cyclic pressure is characterized by an increase rate, a peak pressure value, a duration to maintain the peak pressure value, and a decrease rate.

Detailed disclosure and examples are provided below.

BRIEF DESCRIPTION OF FIGURES

Like elements are labeled using like numerals.

DETAILED DESCRIPTION

Figure 1:
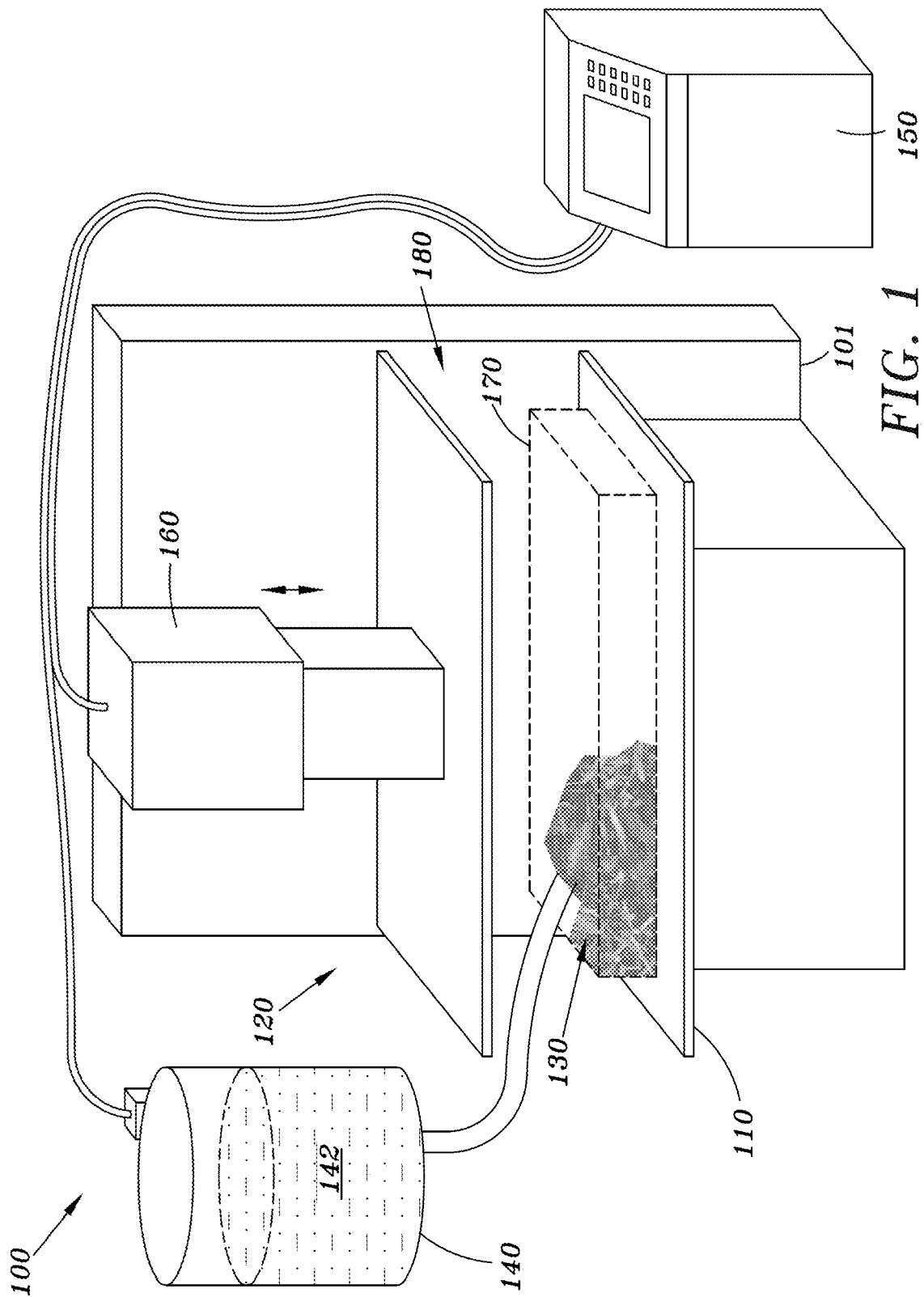
FIG. 1 is a schematic illustration of one embodiment of a system for making increased density structural composites.

FIG. 1 is a schematic illustration of one embodiment of a system 100 for making increased density structural composites. A structural composite may include a laminated polymer formed with a fibrous material being a primary reinforcement and a polymer matrix cured from a liquid state to a solid state, holding the fibrous material therein. The system 100 includes a compression station 101. The compression station 101 includes a first plate 110 having a surface supporting fibrous materials 130. The first plate 110 provides a first surface. In some embodiments, the first surface is flat as illustrated. In other embodiments, the first surface may be contoured, such as to form a mold of a designed shape.

The fibrous materials 130 may be randomly placed, or placed in an organized manner (as further discussed in FIGS. 3 and 4), between the first plate 110 and a second plate 120. The second plate 120, like the first plate 110, may be a flat surface or contoured as to form any desired shape. The first plate 110 and the second plate 120 may be coated with a permanent release coating (e.g., TEFLON) or sprayed with a temporary coating (e.g., spray mold release). Although the first plate 110 and the second plate 120 are illustrated as flat boards, other forms or shapes are possible. For example, in other embodiments, the first plate 110 and the second plate 120 may be a multi-part mold, or of specific surface texture or shape. In still other embodiments, configurations that include additional plates of the same or different shapes, sizes and arrangements may be provided.

An actuator 160 moves the second plate 120 vertically or as needed to compress the fibrous materials 130 between the first plate 110 and the second plate 120. The actuator 160 may use hydraulic or gear mechanisms to move the second plate 120. In some instances, the actuator 160 may include two or more separate actuators to control the orientation of the second plate or other plates. The actuator 160 may be affixed onto a support frame 102 (not expressly shown) that provides support for the first plate 110 during the compression. In other instances, the actuator 160 may actuate both the first plate 110 and the second plate 120 simultaneously to compress the fibrous materials 130 in between.

In the example illustrated, the fibrous materials 130 is a biomass material that includes corn husks or leaves, but other fibrous materials may also be used, such as chipped wood, bamboo, kenaf, hemp, sugarcane, or the like. The amount of fibrous materials 130 used may fill up a predetermined fill volume 170 that is defined by an area and a height, or some other desired volume or shape. In other embodiments, the first plate 110 may have a form of a tray of a depth for defining the fill volume 170. The fibrous materials 130 are to be mixed with a polymer liquid 142 before compression. The polymer liquid 142 may be any suitable polymer liquid suitable for structural composites, such as epoxy resin, phenol-formaldehyde, polyester, polypropylene, polyethylene, and the like. In the present example, the polymer liquid 142 is phenol-formaldehyde or polyesters suitable for mechanical-structural uses, but other materials may be used depending on cost and application requirements.

Figure 2:
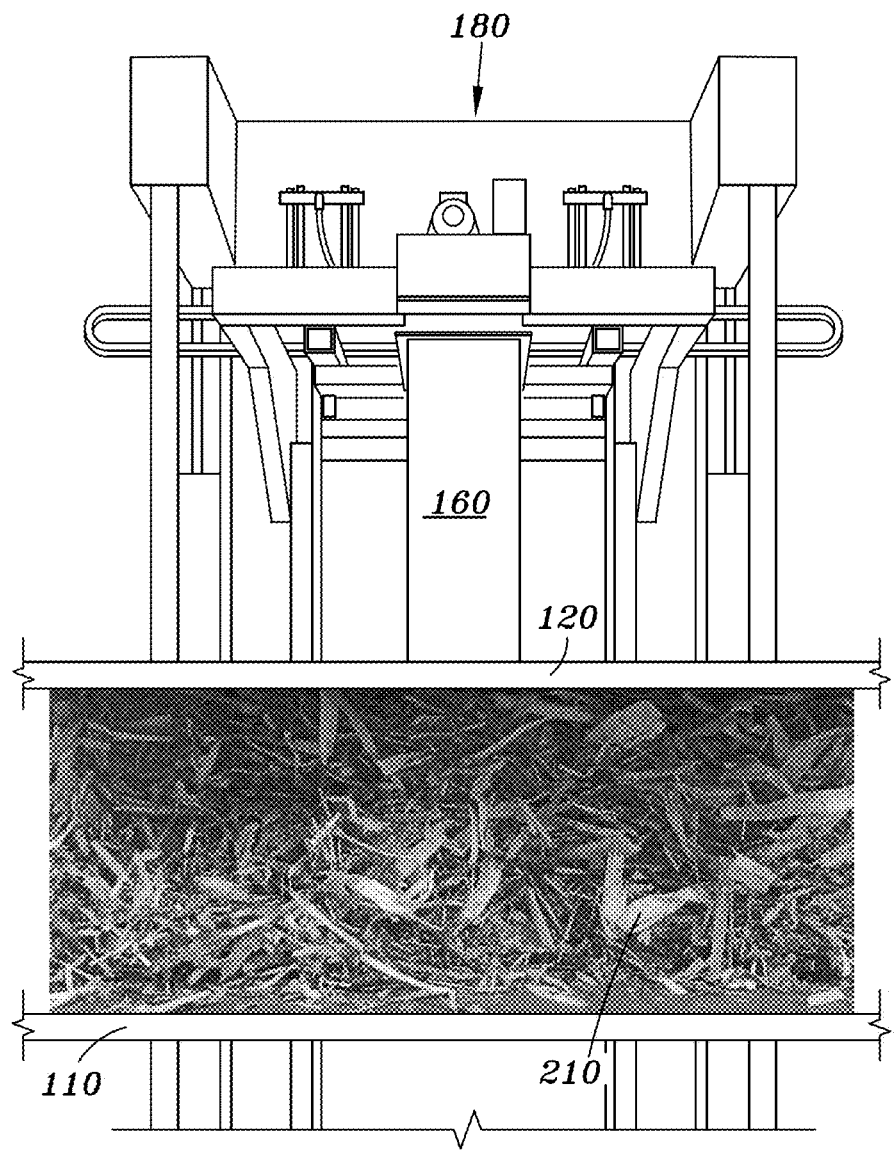
FIG. 2 is a schematic illustration of a front view of the system shown in FIG. 1.

The system 100 further includes a dispenser 140 operable to deposit the polymer liquid 142 onto the plurality of fibrous materials to form a composite mixture 210 (illustrated in FIG. 2). In some embodiments, the dispenser 140 includes a container that allows a polymer liquid to be mixed therein and an outlet for depositing the mixed liquid. The dispenser 140 may spray the polymer liquid 142 onto the fibrous materials 130 or otherwise evenly apply the polymer liquid 142 thereon. For example, in some embodiments, the dispenser 142 may mix the composite mixture 210 in a mechanical manner. In some other examples, the first plate 110 and the second plate 120 may also assist the dispenser 140 to distribute the polymer liquid 142, such as by compressing the composite mixture 210 having more polymer liquid 142 at the center in order to spread even the polymer liquid 142 toward the perimeter. The mixing and dispensing operations may be realized using proper mechanisms known in the art, such as a blender and a sprayer.

The system further includes a control terminal 150, which could be a distributed control that outputs pressure control signals to the actuator 160 for controlling the second plate 120. As discussed in detail in FIG. 5 below, the pressure signal may include a number of cycles or iterations. A cycle may include an application of a first cyclic pressure and a decrease of the first cyclic pressure before the polymer liquid solidifies. The pressure control signal may further include a second constant pressure (or one or more pressures) for a period of time sufficient for the polymer liquid to at least partially cure into a solid compound. An example of one embodiment of a pressure signal is illustrated and described in details in FIG. 5. In some embodiments, the control terminal 150 also controls the dispenser 140 to operate any mixing, dispensing operations, or both. For example, the control terminal 150 may be connected to the dispenser 140 to determine an onset of mixing of the polymer liquid as to determine the time information for controlling the actuator 160. In another instance, the control terminal 150 may control where and when the polymer liquid is dispensed or mixed with the fibrous materials 130 so as to generate the pressure signals accordingly.

FIG. 2 is a schematic illustration of a front view 180 of the system 100 as shown in FIG. 1. As depicted in the front view 180, the composite mixture 210 of the fibrous materials 130 is randomly deposited between the first plate 110 and the second plate 120. When the first plate 110 and the second plate 120 compress the composite mixture 210, the loose spaces among the fibrous materials 130 will be substantially removed. However, some air may be trapped or absorbed by the polymer liquid 140 in the composite mixture 210. The trapped or absorbed air would cause structural defects and weaknesses if it were not removed before the composite mixture 210 cures into a solid piece. The system 100 can operate to remove the trapped or absorbed air by applying a cyclic pressure further discussed in FIG. 5.

To achieve a high efficiency in placing the fibrous materials 130 between the plates 110 and 120, the fibrous materials 130 are randomly organized as shown in FIG. 2. In such manner, however, the structural property of the finished composite would not be as quasi-isotropic compared to an oriented variant of the same fibrous material 130 when deposited in a predetermined pattern. For example, the fibrous materials 130 can be deposited in multiple layers (or laminates), each layer having a primary orientation. Two examples are further illustrated in FIGS. 3 and 4 for forming the composite mixture 210.

In some embodiments, the polymer liquid 142 in the composite mixture 210 weighs about 8% of a net weight of the plurality of fibrous materials 130. In other instances, the actual weight or volume ratio depends on the desired density and strength in the final product. For example, the polymer liquid 142 of the the composite mixture 210 may weigh somewhere in the range from about 3% to about 20% of the net weight of the plurality of fibrous materials 130. An ordinary artisan would select a proper combination of the fibrous materials 130 and the polymer liquid 142 to achieve the related or desired density/strength requirement.

Figure 3:
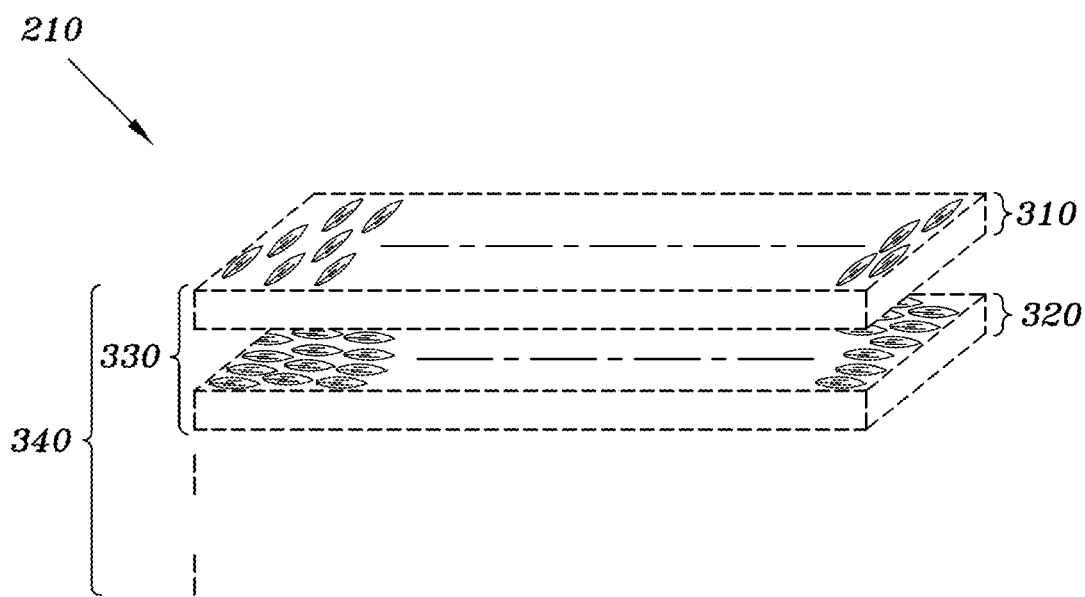
FIG. 3 is a schematic illustration of another embodiment depositing the fibrous materials shown in FIG. 1.

FIG. 3 is a schematic illustration of another embodiment depositing the fibrous materials 130 to form the composite mixture 210 shown in FIGS. 1 and 2. The composite mixture 210 includes a number of bidirectional layers 330 that forms the overall layup volume 340. The overall layup volume 340 is to be compressed between the first plate 110 and the second plate 120. Each of the bidirectional layers 330 includes a first layer 310 having the fibrous materials 130 oriented in about a 90-degree direction and a second layer 320 having the fibrous materials 130 oriented in about a zero-degree direction. The layer 330 may thus be referred to as a 0°-90° bidirectional layer. Although the first layer 310 and the second layer 320 are illustrated having well-aligned directional depositions, actual orientations of the deposition may vary with an expected error. For example, as the fibrous materials 130 are deposited, each individual piece may not precisely follow the designated alignment but substantially follow a general direction.

Figure 4:
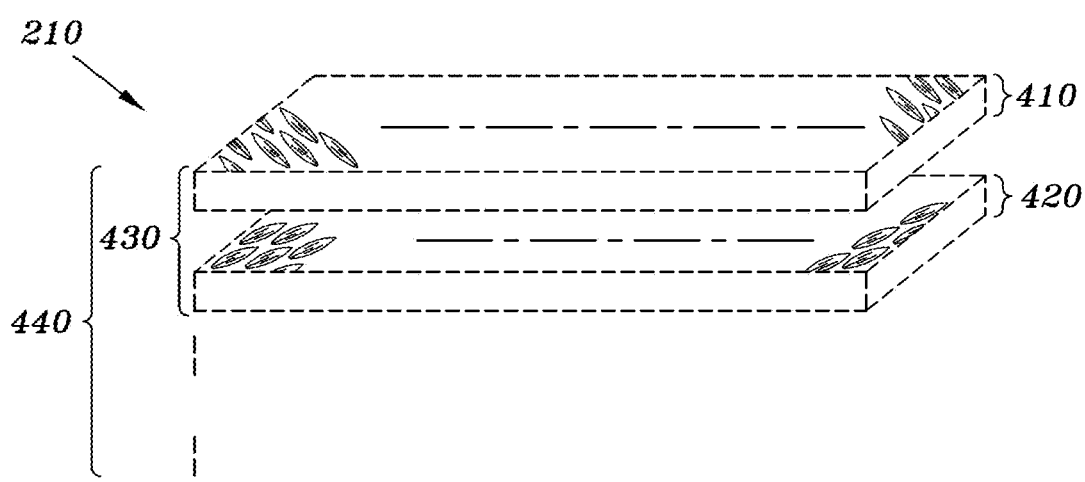
FIG. 4 is a schematic illustration of another embodiment depositing the fibrous materials shown in FIG. 1.

FIG. 4 is a schematic illustration of another embodiment depositing the fibrous materials 130 to form the composite mixture 210 shown in FIGS. 1 and 2. Similar to the example of FIG. 3, the composite mixture 210 includes a number of bidirectional layers 430 that forms the overall layup volume 440. The overall layup volume 440 is to be compressed between the first plate 110 and the second plate 120. Each of the bidirectional layers 430 includes a first layer 410 having the fibrous materials 130 oriented in about a 45-degree direction and a second layer 420 having the fibrous materials 130 oriented in about a negative 45-degree direction. The layer 430 may thus be referred to as a 45°-45° bidirectional layer.

Although FIGS. 3 and 4 provide two explicit orientation examples, other configurations and fibrous material orientations are possible. In other instances, the primary orientations of the multiple layers may inclusively vary between 45°-45° to 0°-90°.

Figure 5:
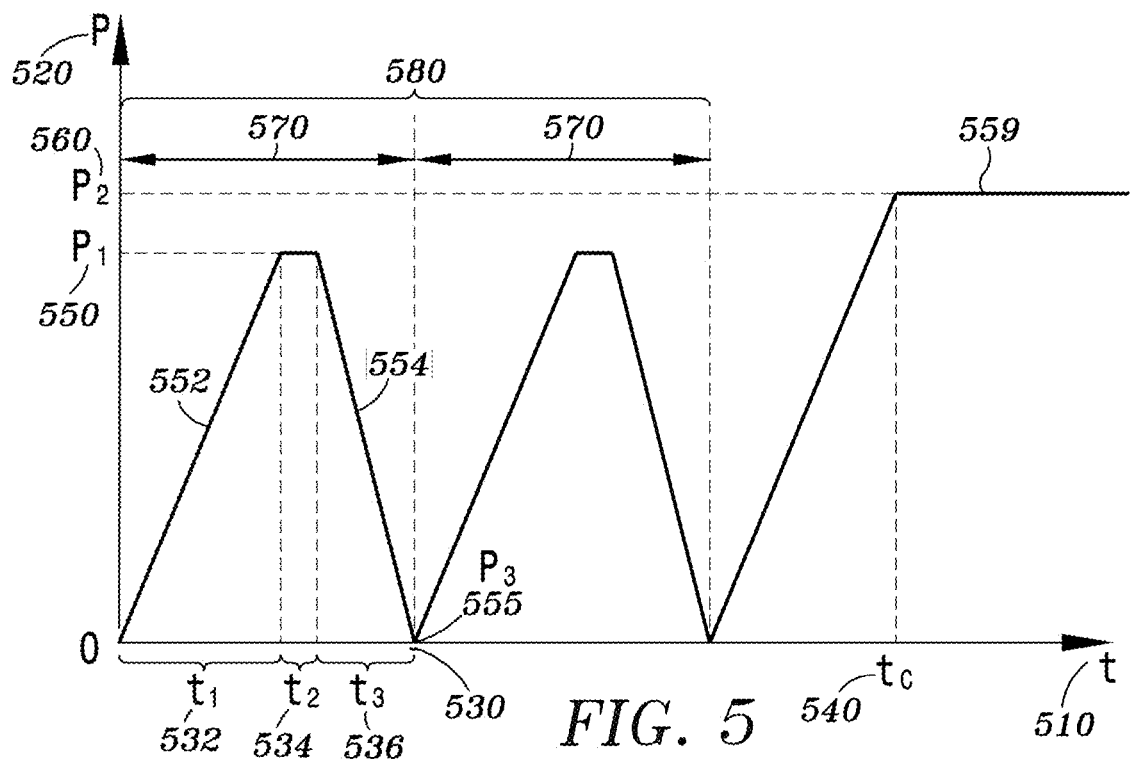
FIG. 5 is a graph showing the pressure control signal represented in the pressure variation in relation to time according to one embodiment.

FIG. 5 is a graph showing a pressure control signal represented in the pressure variation in relation to time. The horizontal axis represents time 510, and the vertical axis represents pressure 520 applied onto the composite mixture 210. The pressure control signal may be sent when the polymer liquid 142 becomes ready to cure, for example, when it is evenly mixed and ready to be blended with the fibrous materials 130. Thus the initiation may be marked at time zero.

The polymer liquid 142 does not start to more fully cure until $t_c$ 540, when the polymer liquid 142 becomes uneven and substantially loses its low viscosity when freshly mixed. In the present example, $t_c$ 540 is about 20 minutes. Between time zero and $t_c$ 540, a first cyclic pressure 580 may be applied onto the composite mixture 210. The cyclic pressure 580 includes a number of pressure cycles 570. Although two cycles 570 are illustrated in FIG. 5, three or more cycles 570 may be configured depending on application and required specifications. In other embodiments, the cycles 510 may not be identical or alike, or may not be linear as illustrated.

In cycle 570 as illustrated in FIG. 5, the pressure first rises at a first rate 552 during a first period $t_1$ to reach a peak pressure $P_1$ 550. The peak pressure $P_1$ 550 sustains during a second period $t_2$ 534. At the end of $t_2$ 534, the pressure decreases at a second rate 554 to a valley pressure $P_3$ 530. In the current example, $P_3$ 530 is zero; however, in other embodiments, $P_3$ 530 may be greater than zero or below zero (as a vacuum would be applied to the system 100). The current example shows the first rate 552 and the second rate 554 are each constant for a linear relationship, however, they can each be a nonlinear function, such as exponential, parabolic, or others.

After the cyclic pressure 580, a second constant pressure $P_2$ 560 may be applied at $t_c$ 540, which may be greater than $P_1$ 550. In other instances, $P_2$ 560 may be equal to or smaller than $P_1$ 550. A constant pressure 560 may be applied for a curing period 559, during which the composite mixture 210 will thoroughly solidify. In other embodiments, the pressure 580 is not constant and may include two or more different pressure levels. In some embodiments, the curing period 559 is about 48 hours total, including 24 hours at room temperature and then another 24 hours at 40° C. for insuring a cull crosslinking. Actual curing period 559 depends on the polymer liquid 142 used and other factors.

Figure 6:
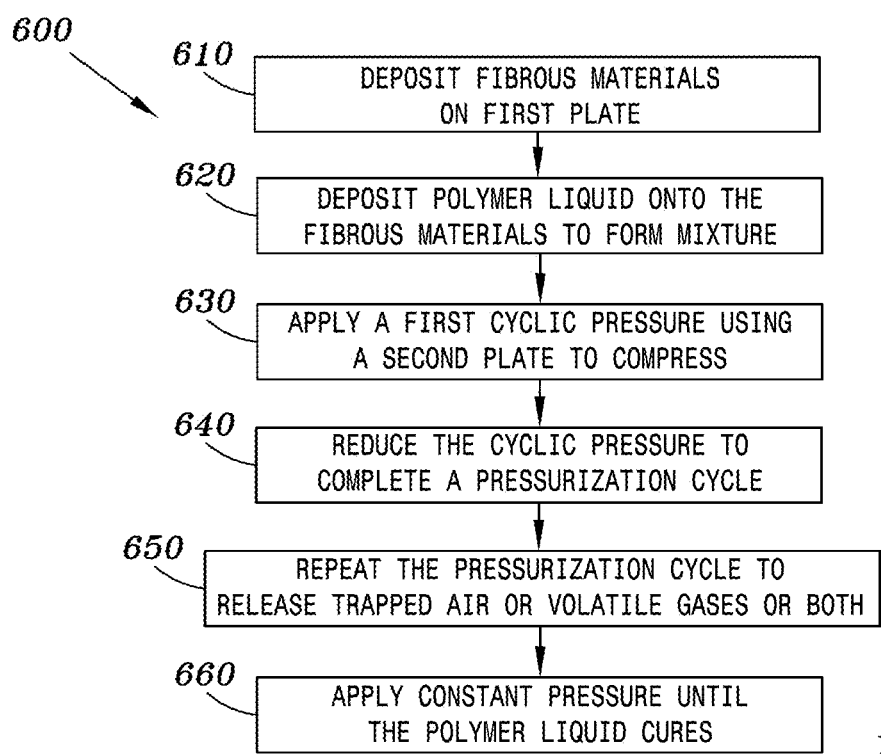
FIG. 6 is a flowchart illustrating a method for making increased density structural composites.

FIG. 6 is a flowchart 600 illustrating a method for making increased density structural composites. The method 600 begins at block 610 where a plurality of fibrous materials are deposited on a first plate or surface. The fibrous material may include corn husks, leaves, or other biomass materials. The plurality of fibrous materials may be deposited in multiple layers, and, in one embodiment, each layer having a primary orientation of the fibrous materials.

At 620, a polymer liquid is deposited onto the plurality of fibrous materials to form a composite mixture. The plurality of fibrous materials and the polymer liquid may be mixed using a mechanical or other means to evenly distribute the liquid onto the plurality of fibrous materials to form the composite mixture. The plurality of fibrous materials may absorb and become saturated with the polymer liquid. The polymer liquid may have a working period prior to initiation of curing. In some instances, the working period may be no less than 20 minutes.

In some embodiments, the plurality of fibrous materials is deposited in a random manner. In some other embodiments, the composite mixture includes primary orientations in multiple layers, which, for example, inclusively may vary between 45°-45° to 0°-90°. The polymer liquid may weigh about 8% of a net weight of the plurality of fibrous materials in one embodiment, or may be found in a range from about 3% to about 20% in other embodiments.

At 630, a first cyclic pressure is applied onto the composite mixture using a second plate or member to compress toward the first plate. At 640, the cyclic pressure is reduced to complete a pressurization cycle. The reduction of the pressure induces trapped air and volatile gases to escape from the composite mixture 210. For example, the escaped air or gas may be the first air or gas trapped in the fibrous materials before or during the mixing operation with the polymer liquid. In addition, volatile gases other than air may also be trapped as the biomass fibrous materials or the polymer liquid may contain different solvents or other gaseous substances produced during the mixing operation.

At 650, a predetermined or desired number of the pressurization cycles are applied for releasing trapped air and volatile gases from the composite mixture. The first cyclic pressure is characterized by an increase rate, a peak pressure value, a duration to maintain the peak pressure value, and a decrease rate. The peak pressure value approximately equals to the constant pressure value.

Finally, at 660, a second constant pressure is applied to the composite mixture using the second plate until the polymer liquid has become cured into a solid state. The second constant pressure is characterized by a constant pressure value. In other embodiments, the second pressure may not be continuously constant, but may vary.

The disclosure above provides enumerated examples. Other implementation and embodiments are possible within scopes of the following claims.

What is claimed is:

1. A method for making a structural composite board, the method comprising:
   depositing a plurality of fibrous materials adjacent a first surface;
   depositing a polymer liquid onto the plurality of fibrous materials to form a composite mixture;
   applying a cyclic pressure onto the composite mixture for releasing trapped air and volatile gases from the composite mixture, wherein the cyclic pressure is characterized by an increase rate applied for a first duration ($t_1$), a peak pressure value applied for a second duration ($t_2$) to maintain the peak pressure value, and a decrease rate applied for a third duration ($t_3$),
   wherein the first duration ($t_1$) is greater than the third duration ($t_3$);
   ending the cyclic pressure to complete a pressurization cycle; and
   applying one or more pressures to the composite mixture until the polymer liquid has become cured into a solid state.

2. The method of claim 1, further comprising mixing the composite mixture to distribute the polymer liquid on the plurality of fibrous materials.

3. The method of claim 1, wherein the plurality of fibrous materials absorbs and becomes saturated with the polymer liquid.

4. The method of claim 1, wherein the polymer liquid weighs an amount in a range from about 3% to about 20% of a net weight of the plurality of fibrous materials.

5. The method of claim 1, wherein the plurality of fibrous materials are deposited in multiple layers, each layer having a primary orientation of the fibrous materials.

6. The method of claim 5, wherein the primary orientations of the multiple layers inclusively vary between about 45-45 degrees to about 0-90 degrees.

7. The method of claim 1, wherein the plurality of fibrous materials is deposited in a random manner.

8. The method of claim 1, wherein the plurality of fibrous materials comprises corn husks or leaves or both.

9. The method of claim 1, wherein the polymer liquid has a work time of about twenty to thirty minutes.

10. The method of claim 1, wherein the one or more pressures are characterized by a constant pressure value.

11. The method of claim 10, wherein the peak pressure value approximately equals to the constant pressure value.

12. The method of claim 10, wherein the peak pressure value is less than the constant pressure value.

13. The method of claim 10, wherein the peak pressure value is less than the constant pressure value.

14. The method of claim 1, wherein applying the cyclic pressure and the one or more pressures to the composite mixture comprises compressing the composite mixture by moving a second surface toward the first surface.

15. The method of claim 1, wherein applying the cyclic pressure comprises changing an ambient pressure of the composite mixture.

16. The method of claim 1, wherein the cyclic pressure is further characterized by a valley pressure value at a turning point between pressure decrease and pressure increase of the cyclic pressure, the valley pressure value no greater than zero.

17. The method of claim 16, wherein the valley pressure value is lower than zero.

18. The method of claim 1, wherein the duration to maintain the peak pressure value includes about a zero duration.

19. The method of claim 1, wherein the duration to maintain the peak pressure value includes a duration that is greater than zero.

20. A method for making a structural composite board, the method comprising:
   depositing a plurality of fibrous materials adjacent a first surface;
   depositing a polymer liquid onto the plurality of fibrous materials to form a composite mixture;
   applying a cyclic pressure onto the composite mixture for releasing trapped air and volatile gases from the composite mixture, wherein the cyclic pressure is characterized by an increase rate applied for a first duration ($t_1$), a peak pressure value applied for a second duration ($t_2$), and a decrease rate applied for a third duration ($t_3$),
   wherein the first duration ($t_1$) is greater than the third duration ($t_3$),
   ending the cyclic pressure to complete a pressurization cycle; and
   applying one or more pressures to the composite mixture until the polymer liquid has become cured into a solid state.

* * * * *